UNITED STATES PATENT OFFICE.

WM. CLARKE, OF DAYTON, OHIO.

IMPROVEMENT IN PROCESSES FOR MAKING PAPER FROM STRAW.

Specification forming part of Letters Patent No. 14,804, dated May 6, 1856.

*To all whom it may concern:*

Be it known that I, WILLIAM CLARKE, of Dayton, in the county of Montgomery and State of Ohio, have discovered a new and Improved Mode of Preparing Straw and other Vegetable Material used in the Manufacture of Paper; and I do hereby declare that the following is a full and accurate description thereof.

In the preparation of straw and other vegetable material used in the manufacture of paper alkalies are used, all of which are injurious to paper unless neutralized, making it harsh and brittle when made, and subjecting the manufacturer to a serious loss of time in fruitless endeavors to wash the alkalies from all material when used. Now, the discovery which I have made, and which I wish to secure by Letters Patent, is the boiling in with lime and other alkalies coal-tar, about five gallons to each one thousand pounds of material, or such quantity of coal-tar as is necessary to neutralize the quantity of alkali used.

I have found by experiment that any vegetable substance prepared by the use of alkalies, when mixed with the coal-tar, as above named, makes a much firmer paper than is possible to make from the same material without the use of the coal-tar; that the coal-tar will effectually neutralize the lime used, which heretofore has been of great injury to molds and sets used in the manufacture of paper, subjecting manufacturers to great expense to rid the molds and sets of lime by the use of muriatic and other acids. The coal-tar prepares the material to be made into paper to receive colors, such as may be desired, which has heretofore been found impossible to do in consequence of the alkalies remaining in the material, which in straw and other materials cannot be washed out so as to be colored with any degree of certainty, and no way has heretofore been discovered to neutralize the alkali without great expense by the use of muriatic or other expensive acids.

Many benefits and advantages resulting from my discovery might be named which make it valuable.

First. The changing of the nature of the vegetable material used, and making much firmer paper than can be made without its use.

Second. The expense of the coal-tar being very much less than any other known substance to neutralize lime.

Third. Its leaving the straw or other vegetable substance in such state that the common substances used in coloring are not destroyed by the lime; that blue or other colors may as easily be made as if no lime were used. No time is lost to the manufacturer in washing his material.

Fourth. Great expense is saved to the manufacturer in time and expense incurred in cleaning his molds and felts.

What I claim as my invention or discovery, and desire to secure by Letters Patent, is not the use of lime or other alkalies used in the preparation of vegetable material used in the manufacture of paper; but

What I do claim is—

The boiling of coal-tar in with the straw or other vegetable material for the manufacture of paper in the manner and form hereinbefore set forth, and for other similar purpose or purposes substantially the same.

WILLIAM CLARKE.

Witnesses:
 DANIEL P. NEAD,
 JOHN SCOTT.